(12) United States Patent
Rector et al.

(10) Patent No.: US 7,857,979 B2
(45) Date of Patent: Dec. 28, 2010

(54) ION EXCHANGE REACTOR

(75) Inventors: Tony Rector, Broad Brook, CT (US);
John W. Steele, New Hartford, CT (US);
Durwood Mace Beringer, Suffield, CT (US)

(73) Assignee: Hamilton Sunstrand Corporation, Windsor Locks, CT (US)

(*) Notice: Subject to any disclaimer, the term of this patent is extended or adjusted under 35 U.S.C. 154(b) by 618 days.

(21) Appl. No.: 11/708,811

(22) Filed: Feb. 21, 2007

(65) Prior Publication Data

US 2008/0197080 A1 Aug. 21, 2008

(51) Int. Cl.
*C02F 1/42* (2006.01)

(52) U.S. Cl. .............. 210/685; 210/281; 210/284; 210/289; 210/502.1

(58) Field of Classification Search ............ 210/167.32, 210/181, 263, 264, 281, 282, 283, 284, 285, 210/287, 289, 291, 317, 322, 323.1, 346, 210/484, 485, 502.1
See application file for complete search history.

(56) References Cited

U.S. PATENT DOCUMENTS

| | | | | |
|---|---|---|---|---|
| 2,091,002 A | * | 8/1937 | Lewis | 210/171 |
| 2,126,365 A | * | 8/1938 | Alexopoulos | 68/207 |
| 3,073,505 A | | 1/1963 | Ullger | |
| 3,186,941 A | * | 6/1965 | Skiens | 210/638 |
| 3,664,095 A | * | 5/1972 | Asker et al. | 96/154 |
| 4,430,226 A | | 2/1984 | Hegde | |
| 5,073,502 A | | 12/1991 | Steele | |
| 5,082,568 A | | 1/1992 | Holler | |
| 5,151,194 A | | 9/1992 | Simpson | |
| 5,518,626 A | | 5/1996 | Birbara | |
| 5,525,237 A | | 6/1996 | Birbara | |
| 6,290,847 B1 | | 9/2001 | Cutler | |
| 6,454,941 B1 | | 9/2002 | Cutler | |
| 7,025,884 B2 | | 4/2006 | Mueller | |
| 2005/0115884 A1 | | 6/2005 | Suzuki et al. | |
| 2006/0261010 A1 | * | 11/2006 | Drake | 210/670 |

FOREIGN PATENT DOCUMENTS

| | | |
|---|---|---|
| EP | 0367420 B1 | 1/1992 |
| EP | 0563321 | 10/1993 |
| JP | 2-99187 | 4/1990 |
| JP | 2005-169361 | 6/2005 |
| WO | 97/29048 | 8/1997 |
| WO | 01/21269 | 3/2001 |

OTHER PUBLICATIONS

European Search Report dated Jul. 3, 2008 for EP Application No. 08250615.5.
Japanese Office Action for Application No. 2008-035476 mailed on May 18, 2010.

* cited by examiner

*Primary Examiner*—Matthew O Savage
(74) *Attorney, Agent, or Firm*—Carlson, Gaskey & Olds, P.C.

(57) ABSTRACT

An ion exchange apparatus includes at least one fluid passage that extends between an inlet and an outlet for transporting a fluid having ions therein. At least one cartridge includes an ion exchange material and the cartridge has an ion removal rate of removing the ions from the fluid that varies in response to a concentration of the ions in the fluid.

18 Claims, 3 Drawing Sheets

ION EXCHANGE REACTOR

BACKGROUND OF THE INVENTION

This invention relates to ion exchange reactors and, more particularly, to an ion exchange reactor having low pressure loss and a variable ion removal rate.

Conventional ion exchange reactors are used to remove ions from a fluid, such as water, to maintain electric resistivity, neutral pH, or both. Typical ion exchange reactors circulate fluid through a container filled with closely packed ion exchange media. The close packing of the media produces tortuous flow paths for the fluid as it flows between the media particles. The tortuous flow paths maximize the exposure of the fluid to ionically active surfaces of the media and minimize a diffusion distance that the ions must travel through the water to the ionically active surfaces. In this manner, conventional ion exchange reactors efficiently remove essentially all of the ions from the fluid in one pass through the reactor.

Although effective for ion removal, conventional ion exchange reactors that utilize packed ion exchange media have the disadvantage that the tortuous paths slow the velocity of the fluid and thereby cause a significant pressure drop between incoming fluid and outgoing fluid. The pressure drop can be overcome in part by using a larger, more powerful pump to move the fluid through the reactor. However, using a larger pump adds size and expense to the system. Further, since conventional reactors essentially remove all of the ions, control over the electric resistivity or pH of the fluid is limited.

Accordingly, there is a need for an ion exchange reactor that provides control over ion removal, and in turn over electric resistivity and pH, while achieving a relatively low pressure drop.

SUMMARY OF THE INVENTION

An example ion exchange apparatus includes at least one fluid passage that extends between an inlet and an outlet for transporting a fluid having ions. One or more cartridges include an ion exchange material. The cartridge has an ion removal rate that varies in response to a concentration of the ions in the fluid and the fluid velocity through the reactor.

An example method of controlling ion removal from a fluid flowing through the ion exchange apparatus includes the steps of establishing a first ion removal rate when a concentration of ions in the fluid is at a first ion concentration, and establishing a second, lower ion removal rate when the concentration of ions is at a second, lower ion concentration.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
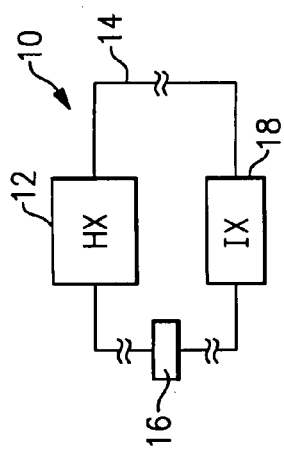
FIG. 1 is an example cooling system utilizing an ion exchange reactor.

FIG. 1 illustrates selected portions of an example cooling system 10, such as an ultra-pure water cooling system. In this example, the cooling system 10 includes a heat exchanger 12 arranged within a cooling loop 14. The cooling loop 14 circulates a coolant, such as water, between the heat exchanger 12 and a device 16 that the coolant maintains at a desired temperature. The cooling loop 14 employs an ion exchange reactor 18 to maintain the coolant in a desired pure state. For example, the ion exchange reactor 18 removes ions from the coolant to maintain a desired level of electrical resistivity and/or a desired coolant pH. It is to be understood that the above described coolant system 10 is an example, and that other types of systems will also benefit from the ion exchange reactor 18.

Figure 2:
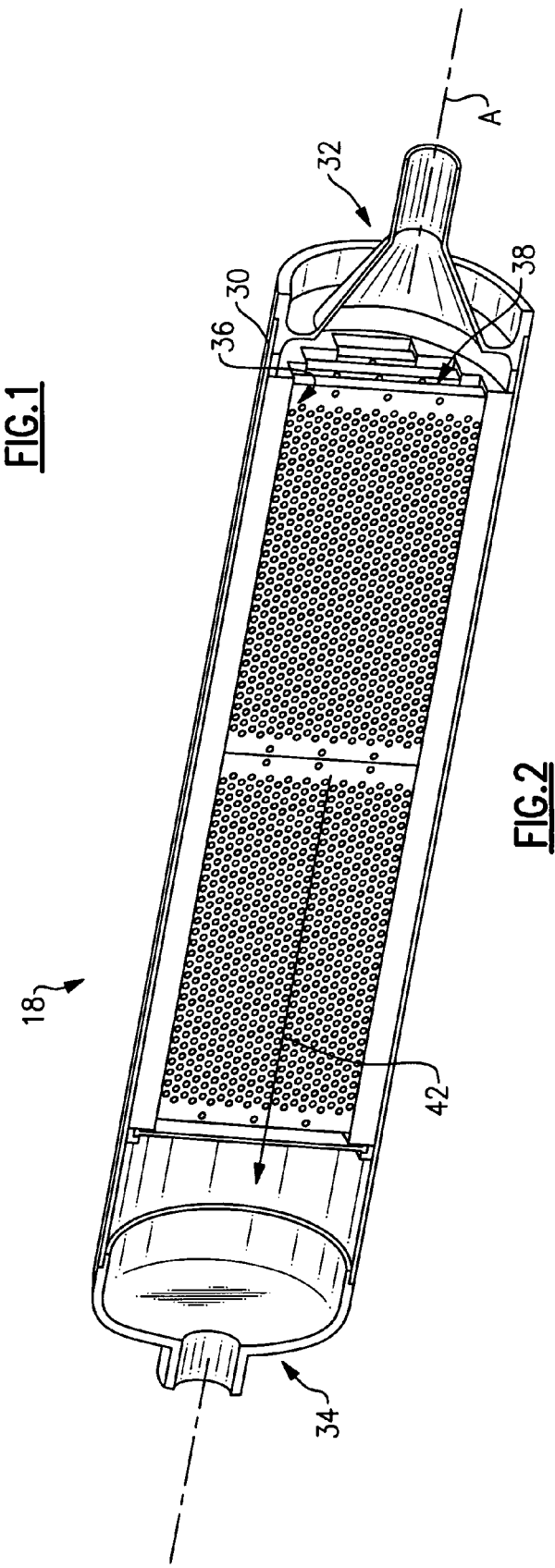
FIG. 2 is an example of the ion exchange reactor of FIG. 1.

FIG. 2 illustrates an example of the ion exchange reactor 18, which includes an outer container 30 having an inlet 32 and an outlet 34. Although the container 30 is cylindrically shaped in this example, any number of different shapes may be used. The container 30 encloses at least one cartridge 36 for removing the ions from the coolant. In the illustrated example, a plurality of the cartridges 36 are used. However, it is to be understood that the number of cartridges 36 may be varied depending upon the ion removal needs of a particular system.

Figure 3:
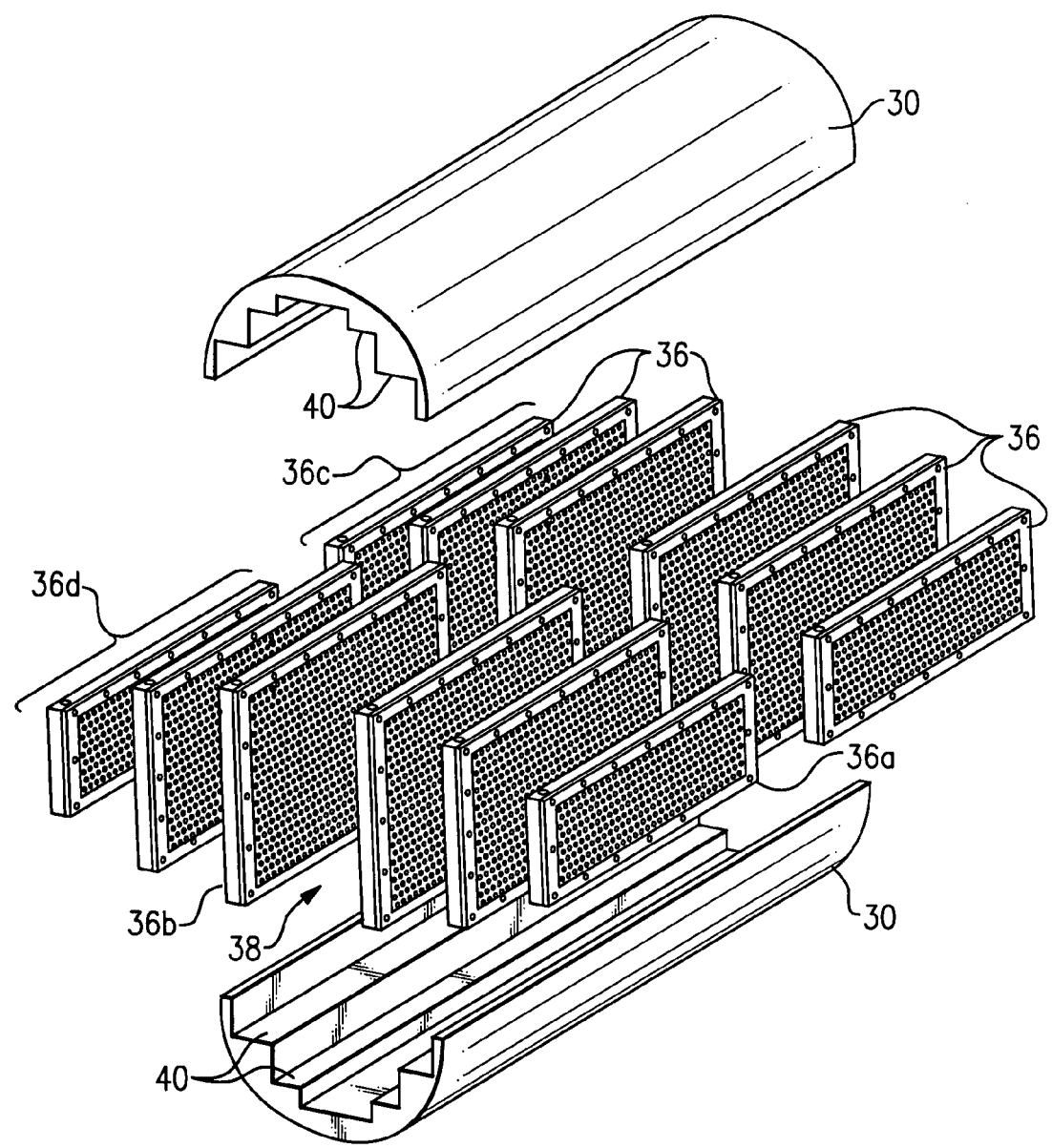
FIG. 3 is an exploded view of the example ion exchange reactor.

Referring also to the exploded view in FIG. 3, the cartridges 36 are spaced apart such that there are fluid passages 38 that extend between the cartridges 36. The amount of spacing between the cartridges 36 depends upon the desired ion removal performance, as will be described. The cartridges 36 vary in size. For example, a cartridge 36a located radially outwards from a centerline A of the container 30 is smaller than a cartridge 36b located closer to the centerline A. That is, the cartridge 36a includes less interfacial surface area exposed to the fluid passages 38 than the cartridge 36b.

The container 30 includes stepped grooves 40 for retaining and positioning the cartridges 36. In this example, the stepped grooves 40 position a first set of cartridges 36c parallel and end-to-end with a second set of cartridges 36d. Alternatively, only one set of cartridges 36 could be used, or a greater number than two sets of cartridges may be used, depending upon the ion removal needs of a particular system.

The stepped grooves 40 also position the cartridges 36 approximately parallel to a flow direction 42 (FIG. 2) through the ion exchange reactor 18. Thus, the fluid passages 38 extend linearly between the ends of the cartridges 36 and provide little or no resistance to coolant flow between the cartridges 36.

Figure 4:
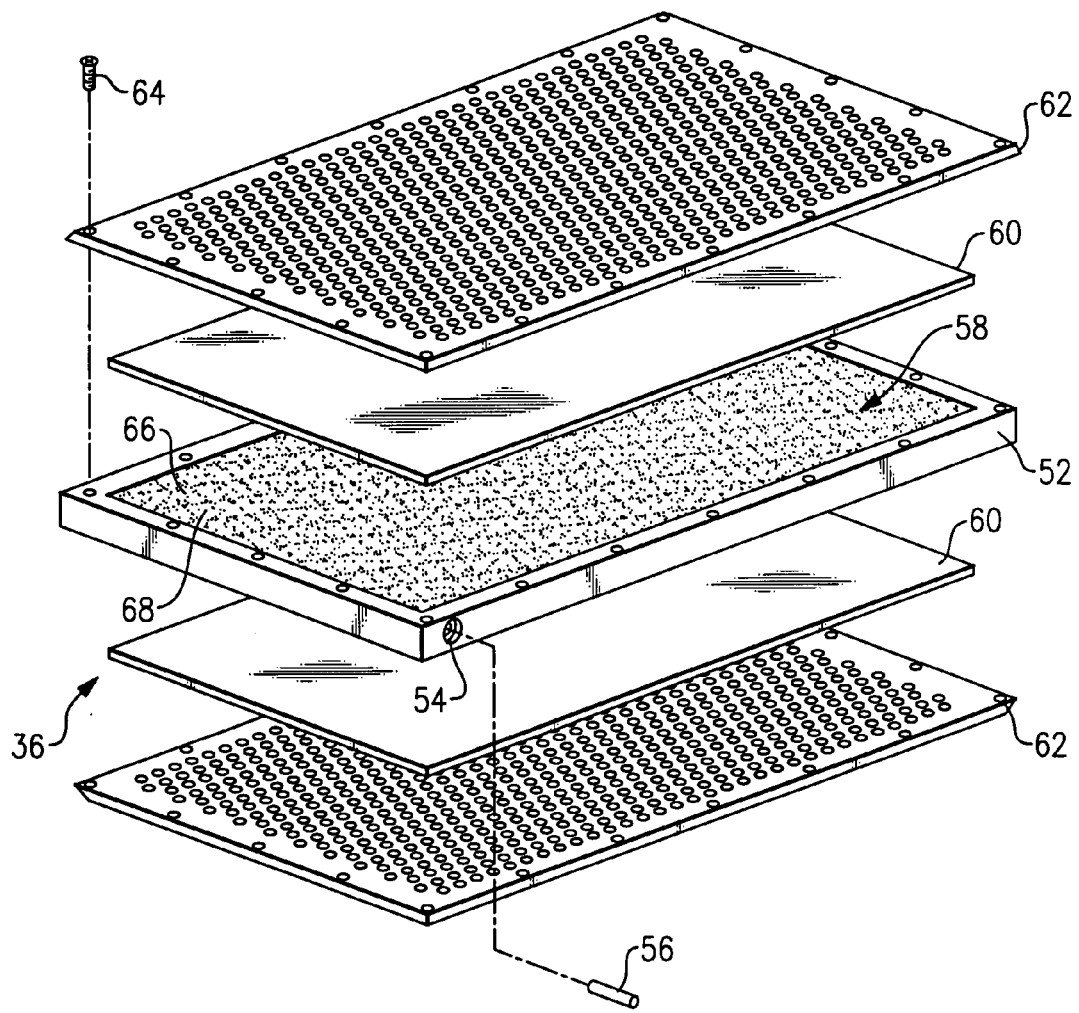
FIG. 4 is an exploded view of an example cartridge for use in the ion exchange reactor.

FIG. 4 illustrates an exploded view of an example cartridge 36. In this example, the cartridge 36 includes a frame 52. The frame is a rectangular ring defining an interior open space. It is to be understood however, that the shape of the frame 52 may vary from the disclosed example, depending upon design factors, such as the size requirements of a particular system. Optionally, the frame 52 also includes an opening 54 and a seal 56 that removably fits within the opening 54. The opening 54 provides access the interior of the frame 52 to permit filling or removal of an ion exchange media 58 into the cartridge 36.

A porous screen 60 is attached on each planar side of the frame 52 between porous covers 62 that are secured to the frame 52. In this example, fasteners 64 extend through the porous covers 62 and into the frame 52 to secure the porous screens 60 between the porous covers 62 and the frame 52. Once assembled, the porous covers 62 and porous screen 60 permit water flow there through from the fluid passages 38 to the ion exchange media 58. The porosity of the porous screens 60 and the porous covers 62 limits the flow of coolant into and out of the cartridge 36.

The ion exchange media 58 includes an ion exchange resin. For example, the resin includes anionic active sites 66 and cationic active sites 68 for, respectively, removing anions and cations from the coolant. Alternatively, the ion exchange media 58 may be another type of ion exchange media suited for the particular system.

The cartridges 36 and their arrangement within the container 30 provide the benefit of an ion removal rate that varies with the concentration of the ions in the coolant. In the illustrated example, the open fluid passages 38 between the cartridges 36 establish a diffusion distance for the ions to travel to the ion exchange media 58. That is, for the ions to be removed from the coolant, the ions must move through the coolant within the fluid passages 38, through openings in the porous cover 62, through openings in the porous screen 60, and to an active site 66, 68 of the ion exchange media 58. The diffusion of ions per unit of time, or mass transfer, is proportional to the concentration and the interfacial surface area of the cartridges 36. That is, increasing concentration and interfacial surface area increases mass transfer. The inverse occurs for decreasing concentration and decreasing interfacial surface area.

At relatively higher concentrations, a portion of the ions diffuse into the cartridges 36 for removal, which results in a relatively high ion removal rate that requires few passes through the reactor 18 to remove a significant amount of the ions. Conversely, at relatively lower concentrations, fewer ions diffuse into the cartridges 36 for removal, which results in a relatively low ion removal rate that requires many passes through the reactor 18 to remove remaining ions. The specific ion removal rates of a particular system will vary, depending on a variety of factors such as the types of ions, coolant flow rate, system corrosion etc.

The ion removal rate is also proportional to the interfacial surface area of the cartridges 36. That is, the rates shift in proportion to the interfacial surface area. For example, if the arrangement in the disclosed example is changed such that the cartridges 36 are closer together, the size of the fluid passages 38 would decrease and the effective interfacial surface area of the cartridges 36 would increase. This would result in a shorter diffusion distance between the fluid passages 38 and the ion exchange material 58, and a corresponding greater ion removal rate. Conversely, if the cartridges 36 where farther apart than in the illustrated example, the size of the fluid passages 38 would increase. This would result in a greater diffusion distance and a corresponding lower ion removal rate. Thus, the spacing between the cartridges 36 at least partially determines the amount of effective interfacial surface area and can be designed to achieve a desired ion removal rate. For example, the spacing of the cartridges 36 can be predetermined through experimentation for desirable ion removal rates.

The variation in ion removal rate provides the benefit of establishing an equilibrium ion concentration level above zero rather than removing essentially all of the ions. At progressively lower concentrations, the ion removal rate approaches zero order and is too slow to remove the remaining ions. By allowing some of the ions to remain in the coolant, the electric resistivity and pH can be controlled to a desired level. For example, a particular equilibrium resistivity and pH may be achieved by using particular sizes and numbers of cartridges 36 and by using a particular spacing of cartridges 36. In the illustrated example, the electrical resistivity is maintained between 0.2 and 5.0 Mohm-cm during operation of the coolant system 10. Controlling the electrical resistivity and the pH of the coolant provides the opportunity to tailor the electrical resistivity and pH of the coolant to the coolant system 10. For example, in coolant systems 10 that utilize ultra pure water, it may be desirable to maintain the resistivity within the above range to prevent current leakage within the device 16 or elsewhere within the coolant system 10. Similarly, controlling the pH to a desired level may provide better control over corrosion within the coolant system 10.

The disclosed example ion exchange reactor 18 provides the benefit of a relatively low pressure drop compared to previously known reactors, and the ability to control the electrical resistivity and pH of a coolant. For example, the open, linear fluid passages 38 allow relatively free flow of the coolant through the ion exchange reactor 18 to thereby produce low pressure drop. Additionally, the arrangement of the cartridges 36 within the container 30 permits variation of the ion removal rate such that the ion exchange reactor 18 becomes more efficient in removing ions at high concentrations and less efficient in removing ions at low concentrations.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An ion exchange apparatus comprising:
a tubular container having an inlet at one end and an outlet at another end and defining a flow direction extending generally linearly from the inlet to the outlet;
at least one generally linear and unobstructed fluid passage extending between the inlet and the outlet for transporting a fluid having ions from the inlet to the outlet;
and at least one cartridge having a porous outer structure defining an interior space and defining at least one porous outer surface arranged to be generally parallel to said flow direction and adjacent to said flow passage, said cartridge having an ion exchange material disposed within said interior space, the at least one cartridge having an ion removal rate of removing the ions from the fluid, and the ion removal rate varies in response to a concentration of the ions in the fluid.

2. The ion exchange apparatus recited in claim 1, wherein the ion removal rate varies in proportion to an interfacial surface area of the at least one cartridge with the at least one fluid passage.

3. The ion exchange apparatus recited in claim 1, wherein the at least one cartridge comprises two cartridges and the at least one fluid passage is located between the two cartridges.

4. The ion exchange apparatus recited in claim 1, wherein the at least one ion exchange cartridge includes a plurality of cartridges that vary in size.

5. The ion exchange apparatus recited in claim 1, wherein the ion exchange material includes anionic active sites and cationic active sites.

6. The ion exchange apparatus recited in claim 1, wherein the porous outer structure includes a first planar porous screen defining one porous outer face and a second planar porous screen defining another porous outer face spaced apart from the first planar porous screen.

7. The ion exchange apparatus recited in claim 1, wherein the at least one cartridge includes a frame supporting the porous outer structure.

8. The ion exchange apparatus recited in claim 7, wherein the frame includes a port and removable seal receivable within the port.

9. The ion exchange apparatus recited in claim 1, wherein the at least one cartridge includes a rectangular frame.

10. The ion exchange apparatus recited in claim 9, wherein said porous outer structure further comprises a first porous cover secured to the one side of the rectangular annular frame, and a second porous cover secured to the opposite side of the rectangular annular frame.

11. The ion exchange apparatus of claim 1, further comprising:
   a plurality of said cartridges each having an ion exchange material therein;
   the plurality of cartridges are spaced apart from one another and includes a first cartridge having a first size and a second cartridge having a second size that is different than the first size; and
   a plurality of fluid passages for transporting a fluid having ions, each of the plurality of fluid passages extending between corresponding ones of the plurality of spaced-apart cartridges.

12. The ion exchange cartridge apparatus recited in claim 11, wherein at each of the plurality of spaced-apart cartridges is oriented parallel to a fluid flow direction between the inlet and the outlet.

13. A method of controlling ion removal from a fluid flowing through an ion exchange apparatus, the method comprising:
   (a) providing the apparatus of claim 1;
   (b) establishing a first ion removal rate of the at least one cartridge when a concentration of ions in the fluid is at a first ion concentration; and
   (c) establishing a second, lower ion removal rate of the at least one cartridge when the concentration of ions in the fluid is at a second, lower ion concentration.

14. The method recited in claim 13, further comprising establishing a non-zero equilibrium of ions within the fluid.

15. The method recited in claim 13, further comprising establishing an equilibrium electric resistivity of the fluid between 0.2 and 5.0 Mohm-cm.

16. The ion exchange apparatus of claim 1, wherein said container includes stepped grooves that position the at least one cartridge.

17. The ion exchange apparatus of claim 16, wherein the stepped grooves position a first set of cartridges in relation to a second set of cartridges.

18. The ion exchange apparatus of claim 17, wherein the first set of cartridges axe aligned parallel and end-to-end with the second set of cartridges.

* * * * *

UNITED STATES PATENT AND TRADEMARK OFFICE
CERTIFICATE OF CORRECTION

| | | |
|---|---|---|
| PATENT NO. | : 7,857,979 B2 | Page 1 of 1 |
| APPLICATION NO. | : 11/708811 | |
| DATED | : December 28, 2010 | |
| INVENTOR(S) | : Rector et al. | |

It is certified that error appears in the above-identified patent and that said Letters Patent is hereby corrected as shown below:

ON THE TITLE PAGE:

The Assignee should read as follows:

(73)   Assignee: Hamilton Sundstrand Corporation, Windsor Locks, CT (US)

Signed and Sealed this
Twenty-second Day of February, 2011

David J. Kappos
*Director of the United States Patent and Trademark Office*